Sept. 24, 1963 V. C. MIRON 3,105,185
VARIABLE-LOAD VOLTAGE REGULATION FOR ALTERNATORS
Filed Feb. 2, 1960 2 Sheets-Sheet 1

Sept. 24, 1963  V. C. MIRON  3,105,185
VARIABLE-LOAD VOLTAGE REGULATION FOR ALTERNATORS
Filed Feb. 2, 1960  2 Sheets-Sheet 2

3,105,185
VARIABLE-LOAD VOLTAGE REGULATION
FOR ALTERNATORS
Vladimir C. Miron, deceased, late of Sioux City, Iowa, by The First National Bank in Sioux City, executor, Sioux City, Iowa, assignor to Wincharger Corporation, a corporation of Minnesota
Filed Feb. 2, 1960, Ser. No. 6,287
4 Claims. (Cl. 322—25)

This invention concerns alternating current generators, and has for its principal object the provision of a novel and very simple arrangement for improving the voltage regulation of such machines; that is, for improving the constancy of the alternating voltage developed, despite substantial variations in the current drawn by the load and in the prime mover.

In the case of comparable direct current generators, close regulation of the output voltage is readily obtained by the use of compounding, as well known to those skilled in the art. Thus, the load current delivered by the D.C. machine can be caused to flow through a series field winding in such a way that as the output voltage tends to drop under heavy loads, the flux developed by the series winding adds to that developed by the shunt winding, thereby tending to increase the output voltage, and thus to offset the drop that would otherwise result from the combined effects of armature resistance, armature reaction, and decreased field current in the shunt field winding. The solution is not so simple for alternating current generators, because, for example, the direct analog would involve rectification of the entire output current of the machine, and for other reasons. Therefore, fairly complex and expensive regulators have generally been needed for this purpose.

An alternating current generating system constructed in accordance with the invention comprises an alternator having a commutator, a main shunt field winding connected across the commutator, an auxiliary field winding which is excited independently of the main field winding and an output winding. The system also includes a pair of independent saturable magnetic cores, each of which is provided with a power winding. A rectifier bridge having A.C. input terminals coupled across the output winding includes D.C. output terminals which are connected to feed the auxiliary field winding. Alternately conducting legs of this rectifier bridge include one of the power windings so as to define, with the auxiliary field winding, an exciter circuit having an impedance which varies inversely with the saturation of the cores. The saturation of the cores is determined by a control winding which, in turn, is energized by a control transformer and a second rectifier bridge. The transformer has a primary winding in series with the output winding and a secondary winding. The second rectifier bridge has a pair of input terminals connected across the secondary winding and D.C. output terminals connected to feed the control winding. In this fashion the degree of saturation of the cores and the effectiveness of the exciter circuit is determined in accordance with the load condition of the alternator.

The current transformer is economical to manufacture, since it has only a few turns of heavy wire on its primary side, and its secondary winding need supply, after rectification, only the small amount of power needed to control the degree of saturation of the reactance device. Magnetic saturation of the current transformer core itself, at high current densities, is prevented by including a small air gap in said core, as well known in the art.

The current requirements of the shunt field winding are small, so that the rectifiers and the "power" windings of the reactance device are also simple and inexpensive. It is, in fact, completely practical to fabricate the saturable device from ordinary lamination steel, using interleaved laminations, and thus avoiding the relatively expensive toroidal cores of special metallurgical and magnetic properties as usually required for saturable devices known by the name of "magnetic amplifiers." The simple construction of saturable device employed in the preferred form of the invention provides adequate effective amplification for its regulatory purpose, as will appear.

The invention will best be understood from the following detailed specification of a preferred embodiment, with certain variations thereof, taken in connection with the appended drawings, in which.

Figure 1:
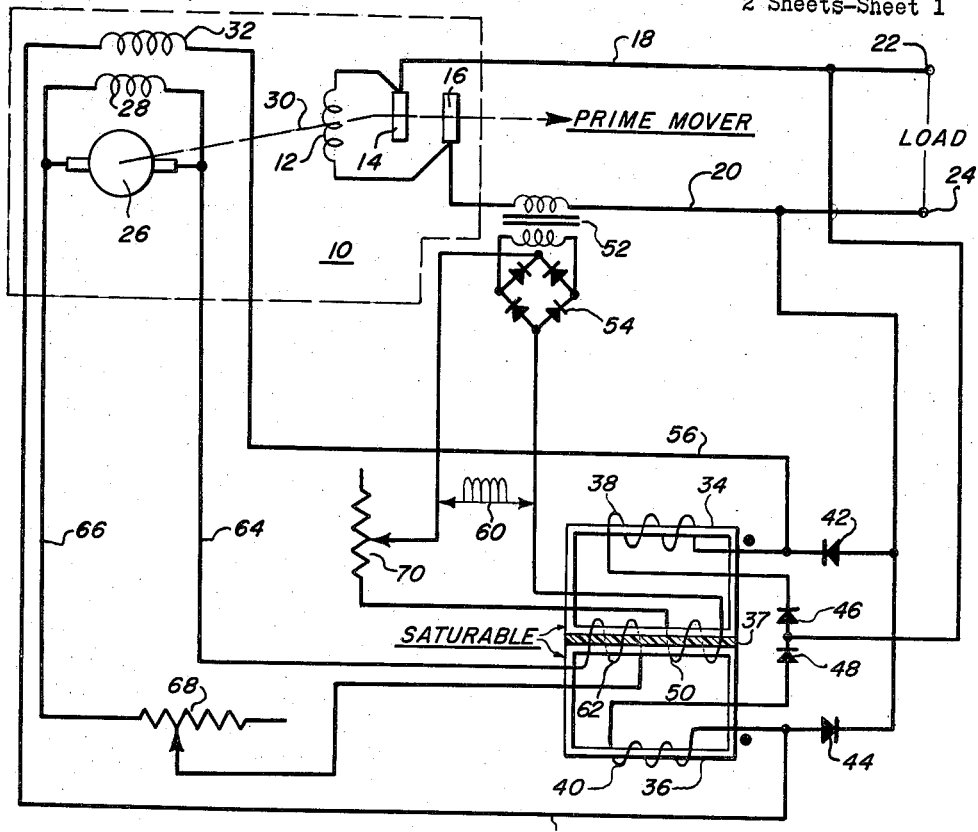
FIG. 1 is a schematic wiring diagram of the invention.

Referring first to FIG. 1 of the drawings, numeral 10 designates as a whole a typical form of alternating current generator to be provided with the invention. The alternator is shown as of the rotating armature type in which the alternating current output is derived from a main armature winding 12 through slip rings 14, 16 whose brushes are connected to output leads 18, 20 and thence to the load terminals 22, 24, as shown. The same armature structure includes a field-supply winding connected to the commutator 26 for rectification, the usual brushes supplying the direct current so produced to the excited field winding 28. A common rotor shaft indicated at 30 mounts the armature windings and core structure, the slip rings, and the commutator, the shaft 30 extending to a prime mover which may, for example, be a gasoline engine.

The foregoing will be recognized as a typical alternator of the self-excited type as widely employed for the generation of alternating currents, particularly in small-to-medium output power ranges. In the present case, however, an auxiliary field winding 32 is provided, to permit the total effective exciting field flux to be controlled in a way to be described. Auxiliary field winding 32 is preferably wound on the same field core structure which carries the usual exciting winding 28, and may, in effect, constitute a portion of winding 28 arranged to be separately fed.

According to the invention, the effective field flux contribution due to winding 32 of the alternator 10 is regulated by supplying this winding with unidirectional current derived from the alternating current output conductors of the machine, and in an amount regulated in accordance with the magnitude of the load current supplied by such machine. To this end, there are provided the saturable cores 34 and 36, each of simple closed magnetic circuit configuration, but disposed with at least a portion of each core adjacent a portion of the other, to facilitate subjecting both cores to control ampere-turns from simple control windings encompassing the adjacent leg portions. Since the two magnetic circuits thus formed are not intended to be magnetically coupled, the adjacent core legs may be separated by a thin spacer 37 of magnetically impermeable dielectric material such as paper or fibreboard.

Each core 34, 36 has wound thereon a "power" winding designated by 38 and 40, and so called because these windings carry the currents energizing auxiliary field 32 from the alternator output. Since the current in field winding 32 has to be unidirectional (to aid or oppose the D.C. flux produced by exciter winding 28), the core windings 38 and 40 are supplied through a rectifier bridge comprising four simple rectifier diodes 42, 44, 46 and 48, arranged in the usual bridge configuration, but with core windings 38, 40 included in respective legs of the bridge which conduct alternately with reference to the alternations of voltage in the alternator output circuit. One of the saturable cores thus controls the current delivered to auxiliary field winding 32 during each half-cycle of alternator output, yet there is no actual flux reversal in either core. This arrangement permits control of the reactance of both cores by a simple coil arrangement encompassing the adjacent core legs, as at 50. This control coil 50 is energized from a current transformer 52 whose primary winding is in series with one alternator output conductor 20, and whose secondary winding provides an alternating voltage proportional to the magnitude of load current supplied by the alternator. This voltage, rectified by conventional full wave bridge rectifier 54, is applied to common core leg control winding 50 to vary the reactances of both core power windings in such a way as to vary the current supplied to field coil 32 from the alternator output conductors. The rectifier elements themselves may be of any chosen type, such as silicon rectifier elements or the like.

The reason for using separate cores 34 and 36, with a power winding of each in a respective alternately-conducting leg of the power rectifier bridge, will now be clear. Auxiliary field winding 32 requires a unidirectional current, and it might be supposed that such could readily be provided by energizing core windings 38, 40 direct from the alternator output, and rectifying the voltage across them for application to the auxiliary field 32. As was recognized early in the development of saturable reactor devices, such arrangements result in direct transformer action between the power and control windings, and apart from the usual objections to the arrangement on this score, the presence of rectifier 54 across control winding 50 would short circuit the latter on half cycles of one polarity.

Further, it will be recalled that the output of usual full-wave or bridge rectifiers, while unidirectional, actually comprises half-cycle pulses or waves of the applied A.C.; unless smoothing filters are provided, these sinusoidal half-waves have to be treated as continuously changing currents or voltages, and where the rectifier is followed by a transformer or a device acting like a transformer, conversion to pure A.C. of double frequency results. If such were to be applied to the auxiliary field 32, the flux due to winding 28 would be aided during one half-cycle and opposed during the next half-cycle, with a net flux change of zero and hence complete loss of the desired control function.

Figure 2:
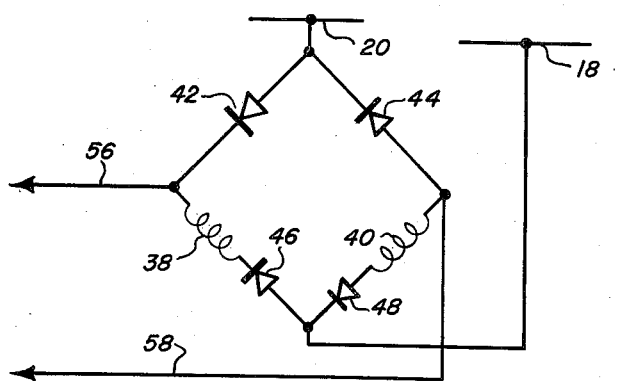
FIG. 2 is a schematic diagram of the rectifier bridge controlling the application of current to the alternator auxiliary field winding, drawn in a different way to aid in understanding the operation of the invention.

The invention overcomes all of these objections in a very effective manner, and with simplified components, by placing the respective power coils 38 and 40 in legs of the rectifier bridge which conduct only during alternate half-cycles of the alternator output. The operation will now be described, in connection with FIG. 1, but the meaning of "alternately conducting" legs of the bridge rectifier may be clarified by reference also to FIG. 2, in which the rectifier and power windings of the saturable reactor are redrawn in the more conventional bridge configuration.

During a half-cycle of alternator output in which its conductor 20 is positive, conventional current flows through rectifier 42, to field winding 32 over conductor 56, back to power winding 40 over conductor 58, and through rectifier 48 to alternator output conductor 18; flow through coil 38 is prevented by rectifier 46. It is assumed that coil 40 is so wound on core 36, or so poled in the circuit, that its flux flows upward in the leg of core 36 passing through the coil, and hence to the left in the portion passing through control winding 50.

During the next half-cycle of alternator output, in which conductor 18 becomes positive, current will flow from that conductor through rectifier 46, power winding 38, to field 32 over conductor 56, back via conductor 58, and through rectifier 44 to alternator output conductor 20. Conduction through coil 40 is blocked by rectifier 48, and it will be noted that on both half-cycles current flows in the same direction through field winding 32, as is desired. Moreover, on the foregoing assumption as to the poling of coil 40, winding 38 will be so poled that the flux therein during this second half-cycle passes downward in the appurtenant leg of core 34, and hence also to the left in that portion of the core which passes through control winding 50. It follows that the flux linking control winding 50 is unidirectional, and the latter winding can therefore be connected to rectifier 54 without any danger of appearing as a shorted winding during half of the alternator output cycles, or as an A.C. source across the D.C. terminals of rectifier 54.

It will also be observed that the control effect of winding 50, on the degree of saturation of cores 34 and 36, is perfectly symmetrical, because the pulsations of current in coil 50 are unidirectional (as indicated at symbol 60), and the same would be true if pure D.C. were supplied to this winding. Thus, suppose the poling of winding 50 directs its flux to the right in its appurtenant core leg, and hence upward in the leg which links winding 38. This flux therefore will oppose the flux due to coil 38 when the latter is conducting current as previously described. Also, the flux induced in core 36 will oppose that due to coil 40 when the latter is conducting. Hence the reactive impedance of the saturable device is varied in the same sense during alternate half-cycles of the alternator output, and the current flow to field winding 32 is controlled strictly in accordance with the amplitude or magnitude of the alternating load current supplied by the alternator.

The circuit constants are so chosen that, for alternator load currents up to a certain desired level, both cores 34 and 36 are held well below saturation flux density, and their windings 38, 40 present maximum reactive impedances to the flow of current to auxiliary field winding 32. This is preferably accomplished by a D.C. bias flux induced in both cores, opposed to the flux direction of coil 50; for example, by a common winding 62 linking both cores and supplied with direct current as from the machine's exciter commutator brushes over conductors 64 and 66. A current adjusting resistor 68 may be included in this circuit for setting the level of this bias flux, but its effect may also be obtained merely by proper choice of the winding 62 relative to the normal exciter voltage available, and the design of cores 34, 36.

The control point at which the alternator load current becomes effective to increase the degree of saturation of cores 34, 36, by reason of flux developed therein by control winding 50, can be adjusted by variable resistor or impedance 70 in this control circuit, as shown. However, for a given installation, this setting also can be obtained by proportioning the current transformer 52 and winding 50, as well known to those skilled in the art. In any event, and as stated, the bias flux due to winding 62 is adjusted so that for normal loads the reactor device presents maximum impedance to currents flowing in auxiliary field winding 32, while control winding 50 opposes the bias flux under higher load conditions, to increase the degree of saturation of the device and hence increase the current in winding 32 so as to offset the drop in alternator terminal voltage that would otherwise accompany the increased current demand of the rising load.

It is a matter of choice, governed by other considerations, whether the power windings 38 and 40 are wound or connected so as to aid or to oppose the flux due to winding 50, because self-saturation of either core due to currents flowing in these windings is not a feature of the invention. It is, of course, necessary that the poling of these coils relative to one another be preserved, and that coils 50 and 62 be in opposition to one another.

Figure 3:
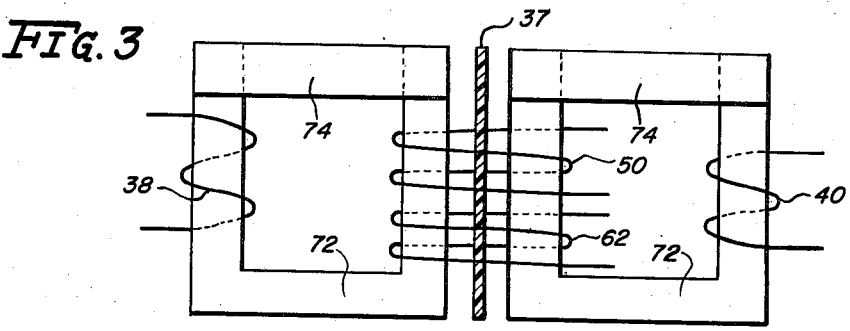
FIG. 3 is a view showing a preferred construction of the saturable magnetic control device itself.

As stated earlier herein, good control of the machine using the described circuitry is obtained using core structures of ordinary laminations of transformer iron. A simple and preferred arrangement is shown in FIG. 3 of the drawings, in which the cores are built up from C laminations 72 interleaved with I laminations 74, suitably clamped to form core assemblies as in conventional transformer construction. Numeral 37 again designates the non-permeable spacer holding the cores from magnetic contact with one another, but they may be air-spaced if desired. Since windings 50 and 62 will desirably encircle the adjacent core legs (for greatest winding simplicity), the spacer permits the adjacent core legs to be held very close together without serious danger of flux leakage from one core to the other.

Figure 4:
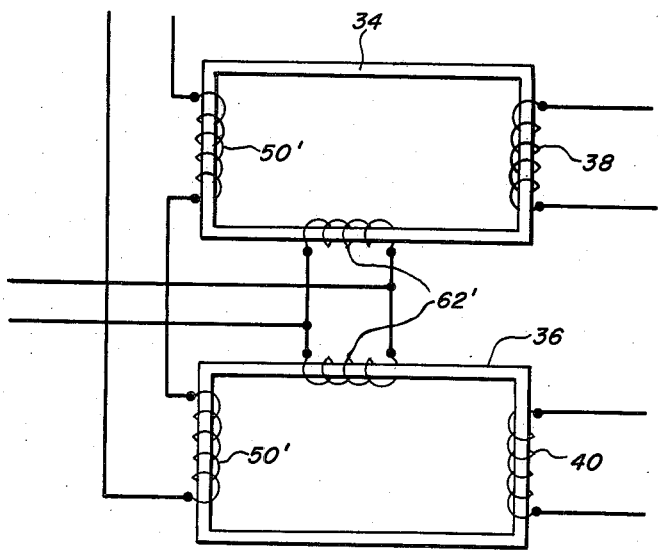
FIG. 4 is a schematic diagram illustrating a variant form of the control device windings.

It will be recognized that the principles of the invention can, however, be carried out with completely and physically separate cores, by sacrificing winding economy. Thus, as illustrated in FIG. 4, the control and/or bias windings can be split into two parts, connected in series and/or parallel with respect to their supply conductors. The two coil halves corresponding to control coil 50 are here designated 50', and those for the bias winding are designated 62'.

Figure 5:
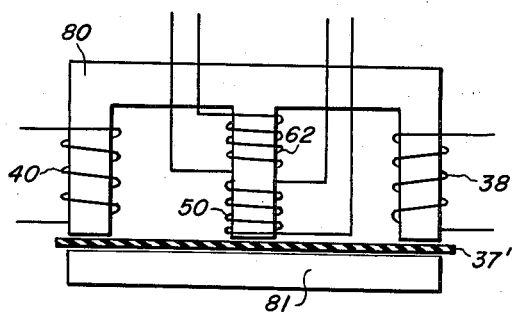
FIG. 5 illustrates an embodiment alternative to those illustrated by FIGS. 3 and 4.

Alternatively, as illustrated in FIG. 5, the core may be formed of an E-shaped section 80 closed by an I-shaped section 81 with a non-magnetic spacer 37' disposed between the two sections. Windings 38 and 40 are wound on the end legs of section 80 and windings 50 and 62 are wound on its center leg.

While the invention has been shown and described herein in considerable detail for purposes of illustration and ready understanding thereof, it will be obvious to those skilled in the art that changes and modifications may be made without departing from the invention in its broader aspects. It is therefore the aim of the appended claims to cover all such changes and modifications as fall within the true spirit and scope of the invention.

What is claimed is:

1. An alternating current generating system comprising: an alternator having a commutator, a main shunt field winding connected across said commutator, an auxiliary field winding and an output winding excited independently of said main field winding; a pair of independent saturable magnetic cores each having a respective power winding; a rectifier bridge having A.C. input terminals connected across said output winding and D.C. output terminals connected to feed said auxiliary field winding, alternately conducting legs of said bridge including one of said core power windings, respectively, to define with said auxiliary field winding an exciter circuit having an impedance which varies inversely with the saturation of said cores; a control winding for determining the saturation of said cores; a control transformer having a primary winding in series with said output winding and having a secondary winding; and a second rectifier bridge having input terminals connected across said secondary winding of said transformer and D.C. output terminals connected to feed said control winding to determine the degree of saturation of said cores and the effectiveness of said exciter circuit in accordance with the load condition of said alternator.

2. An alternating current generating system comprising: an alternator having a commutator, a field winding and an output winding; a pair of independent saturable magnetic cores each having a respective power winding; a rectifier bridge having A.C. input terminals connected across said output winding and D.C. output terminals connected to feed said field winding, alternately conducting legs of said bridge including one of said core power windings, respectively, to define with said field winding an exciter circuit having an impedance which varies inversely with the saturation of said cores; a control winding for determining the saturation of said cores; a control transformer having a primary winding in series with said output winding and having a secondary winding; a second rectifier bridge having input terminals connected across said secondary winding of said transformer and D.C. output terminals connected to feed said control winding to determine the degree of saturation of said cores and the effectiveness of said exciter circuit; a balancing winding for opposing the effect of said control winding; and means, energized by said alternator, for supplying a substantially constant direct current voltage to said balancing winding so that said control winding is effective only during load conditions of said alternator exceeding a preselected value.

3. A generating system in accordance with claim 2 including an adjustable impedance in series with said control winding for adjusting said preselected load value.

4. A generating system in accordance with claim 2 including an adjustable impedance in series with said balancing winding providing a second adjustment for said preselected load value.

References Cited in the file of this patent

UNITED STATES PATENTS

| | | |
|---|---|---|
| 1,710,755 | West | Apr. 20, 1929 |
| 2,525,451 | Graves | Oct. 10, 1950 |
| 2,740,088 | Roberts | Mar. 27, 1956 |